2,993,021
PLASTIC COMPOSITION COMPRISING A VINYL RESIN AND A BIS-N-SUBSTITUTED PYRROLIDINONE

Abraham Bavley, Brooklyn, Karl J. Brunings, Malba, Charles J. Knuth, Flushing, and Albert E. Timreck, Kew Gardens, N.Y., assignors to Chas. Pfizer & Co., Inc., New York, N.Y., a corporation of Delaware
No Drawing. Original application Dec. 12, 1955, Ser. No. 552,289. Divided and this application May 16, 1960, Ser. No. 43,969
3 Claims. (Cl. 260—30.2)

The invention is concerned with a novel group of new bis-N-substituted pyrrolidinones and with certain compositions containing these compounds. Some of these compounds are useful as plasticizers for various plastic materials and particularly for vinyl resins. Certain members of this class are also useful as monomers and comonomers in the preparation of addition polymers. Others are useful in preparing alkyd-type resins. In particular, these compounds are a group of substituted bis-pyrrolidinones in which the two nuclei are connected through their nitrogen atoms by means of certain divalent organic radicals.

The novel compounds of this invention have the following structural formula

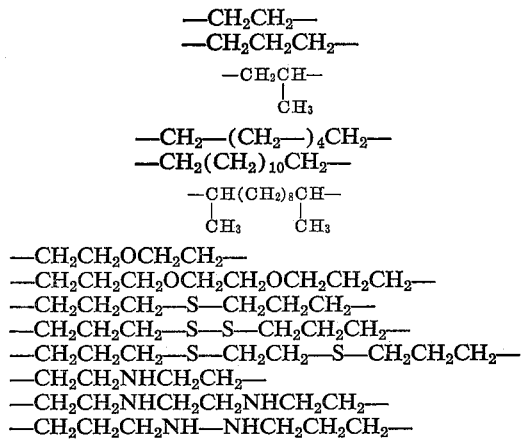

wherein R' is H, or a lower aliphatic hydrocarbon group containing up to about eight carbon atoms, and R is an alkylene, oxalkylene, thialkylene or azalkylene group containing from two to about twelve carbon atoms. Examples of lower aliphatic hydrocarbon groups, R', are the methyl, ethyl, allyl, propargyl, butyl, hexyl, hexenyl, 2-ethylhexyl and octyl groups. These groups are straight or branch chained and may be saturated or unsaturated. The divalent organic radical R when derived from an alkyl group, straight or branch chained is called an alkylene group. It contains from two to about twelve carbon atoms. The carbon chain of said alkylene group is sometimes interrupted by one of the heterogroups —O—, —S—, —NH—, —S—S—, or —NH—NH—. The R group is then called an oxalkylene group when it contains oxygen, a thialkylene group when it contains sulfur, or an azalkylene group when it contains nitrogen. The two nuclear pyrrolidinone ring nitrogens are each attached to to different carbon atoms of said R group. These carbon atoms are sometimes adjacent and sometimes more widely separated. When the R group is an oxalkylene, a thialkylene or an azalkylene group, each carbon atom of said R group is attached to no more than one heterogroup, except for the carbon atoms attached to the pyrrolidinone nitrogen atoms which are not further attached to heterogroups but to one or more carbon atoms. Structures embodying two oxygen, sulfur or nitrogen atoms attached to an aliphatic carbon atom are in general somewhat unstable, particularly under acidic conditions and are therefore less applicable for the uses for which the valuable products of this invention are suited. A further practical limitation on the structure of the R group is that it contain less than about four heterogroups. The diamines corresponding to said structures are largely available or can be synthesized by methods familiar to those skilled in the art. However, the diamines containing four or more heterogroups are not commercially available and they cannot be prepared readily by simple and unequivocal methods. Thus, the above description of the R group can be summarized by saying that R is a divalent organic radical containing from two to twelve carbon atoms and selected from the group consisting of an alkylene group, an oxalkylene group, a thialkylene group, and an azalkylene group wherein said groups contain less than four heterogroups and such that no carbon atom is attached to more than one atom selected from the group consisting of oxygen, sulfur and nitrogen. To further illustrate the configuration of the —R— group in the foregoing structural formula, some examples of alkylene, oxalkylene, thialkylene and azalkylene groups are given below.

—CH$_2$CH$_2$—
—CH$_2$CH$_2$CH$_2$—

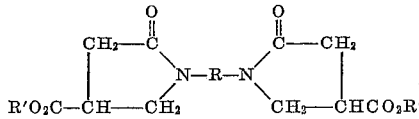

—CH$_2$—(CH$_2$—)$_4$CH$_2$—
—CH$_2$(CH$_2$)$_{10}$CH$_2$—

—CH(CH$_2$)$_8$CH—
  |           |
  CH$_3$    CH$_3$

—CH$_2$CH$_2$OCH$_2$CH$_2$—
—CH$_2$CH$_2$CH$_2$OCH$_2$CH$_2$OCH$_2$CH$_2$CH$_2$—
—CH$_2$CH$_2$CH$_2$—S—CH$_2$CH$_2$CH$_2$—
—CH$_2$CH$_2$CH$_2$—S—S—CH$_2$CH$_2$CH$_2$—
—CH$_2$CH$_2$CH$_2$—S—CH$_2$CH$_2$—S—CH$_2$CH$_2$CH$_2$—
—CH$_2$CH$_2$NHCH$_2$CH$_2$—
—CH$_2$CH$_2$NHCH$_2$CH$_2$NHCH$_2$CH$_2$—
—CH$_2$CH$_2$CH$_2$NH—NHCH$_2$CH$_2$CH$_2$—

In the foregoing structural formula when R' is H the products are dibasic acids. These dibasic acids are useful in preparing alkyd resins by reaction with various types of polyhydroxy compounds and, in some cases, polyhydroxy compounds and monobasic acids by methods well known in the art. Polyhydroxy compounds useful in preparing resins of this type include ethylene glycol, propylene glycol, trimethylene glycol, diethylene glycol, glycerol, pentaerythritol, sorbitol, etc. When the polyhydroxy compound contains three or more hydroxyl groups, the extent of cross-linking is modified by the incorporation of monobasic acids in the reaction mixture. Ordinarily fatty acids are employed. These may include oleic acid or linoleic acid which confer drying-oil properties on the resin or saturated fatty acids such as butyric acid, palmitic acid, or stearic acid. These alkyd resins have novel properties stemming from the unusual structure of the valuable dibasic acids of this invention employed in their preparation.

When R' in the foregoing structural formula is a lower aliphatic hydrocarbon group, the products are diesters useful as plasticizers for various plastic materials, such as synthetic rubber, polyvinyl and polyvinylidene halide polymers and copolymers, and in particular, polyvinyl chloride resins, and vinyl chloride-vinyl acetate copolymers. Plastic compositions of this nature generally comprise the resin and new plasticizer in the relative proportions of about 50 to 95% resins and 5 to 50% plasticizer. Certain members of this series are preferred for this use. For example, when R' is a methyl group, the diesters are solids which are generally water soluble. While such materials can be used in certain instances as plasticizers, it is generally preferred that the plasticizer be a high boiling, water insoluble liquid. Highly useful plasticizers with these properties are found in the fully saturated compounds in this series commencing with about the dibutyl ester. In general, the most useful compounds have a total of at least about ten carbon atoms in the two R' groups and the R group. As the homologous series is ascended, the plasticizing ability of these esters remains high until the R and R' groups contain a total of about 28 carbon atoms at which point their compatability with vinyl resins has decreased to a point of minimum usefulness.

When R' in the foregoing structural formula contains acetylenic bonds the products are diesters useful as plasticizers-stabilizers for polyvinyl halide polymers and copolymers and in particular, polyvinyl chloride resins, polyvinylidene chloride resins and various copolymers containing these monomers. It is thought that these materials possess this added advantage of being stabilizers due to the fact that the acetylenic bond present absorbs any hydrogen halide evolved during the aging and use of the polymer. An example of this class of pyrrolidinones is the product obtained by the reaction of dipropargyl itaconate, described in copending application Serial No. 563,440, filed February 6, 1956, with a diamine.

The compounds of this invention in which terminal olefinic groupings are present in the R' radical are diesters which can be polymerized or copolymerized. By terminal olefinic group is meant the group $$CH_2=C-$$

Polymerization of these materials to thermosetting plastic substances useful in the preparation of cast molded or laminated articles is accomplished by the usual techniques for preparing addition polymers which involves polymerization of the monomer or mixture of monomers either in bulk, emulsion, suspension or solution processes employing the usual type of peroxide initiators such as benzoyl peroxide, di-t-butyl peroxide, t-butylhydroperoxide, etc. Useful copolymers are obtained by using bis-pyrrolidinones of this type with such comonomers as styrene, methyl acrylate, vinyl acetate, etc. The resulting copolymers are thermosetting and heat and solvent resistant. Desirable effects are obtained by the use of these bis-pyrrolidinones as comonomers over a wide range of proportions. For example, a proportion of bis-pyrrolidinone as low as 3% in the copolymer frequently has a useful effect on the softening point of the product. Olefinic esters of this type can also be polymerized alone to novel and useful products.

The valuable diesters of this invention are prepared by allowing the appropriate itaconic diester to react with the desired diamino compound. The following equation represents this process wherein R' is a lower aliphatic hydrocarbon group containing up to about eight carbon atoms and R has the same meaning as above.

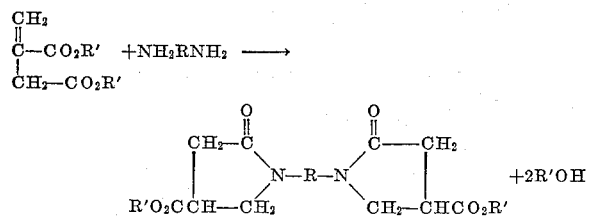

The reaction between the diamine and itaconic diester generally sets in immediately after the reactants are mixed and is manifested by the evolution of heat. Some combinations of diesters and diamines react more vigorously than do others, but in general even in the less reactive cases, an exothermic reaction takes place without delay. It is generally desirable to apply external cooling so that the reaction temperature does not exceed about 80° C. Above this temperature the reaction may become so vigorous as to be impossible to control and decomposition of the product or expulsion of the contents of the reaction vessel may occur. No solvent is required in carrying out this process. After the reaction subsides the alcohol that is a by-product of the condensation is stripped in vacuo. In some cases, it is convenient to remove the by-product alcohol by steam distillation.

If it is desired to purify these valuable products, vacuum distillation is a suitable method. The lower members of the series can be distilled in ordinary laboratory or plant-sized vacuum distillation equipment. For the higher members of the series a short path apparatus and high vacuums are required e.g. 0.01 mm. of mercury or less. For some purposes, the valuable products of this invention are in a usable form after removal of the volatile impurities as described above, and further purification is not required. A number of the itaconic acid diesters used as starting materials are commonly available compounds. Others can be prepared by the application of known esterification procedures. A process that can frequently be advantageously employed involves heating itaconic acid and the desired alcohol with a small amount of p-toluenesulfonic acid catalyst in an inert solvent such as benzene.

The reactants in this process are preferably employed in stoichiometric proportions, that is two moles of ester are employed per mole of diamine. A slight excess, say about ten percent, of the ester component can be tolerated but an excess of the diamine component is to be avoided since some mono-pyrrolidinone product is produced as well as high molecular weight by-products when an excess of the amine is present. Such materials are very difficult to separate from the desired bis-pyrrolidinone product.

Various diamino compounds are readily available and are useful in this process. Among the commercially available diamines that have been employed are ethylenediamine, propylenediamine, trimethylenediamine, hexmethylenediamine, diethylenetriamine

and ethylene bisoxypropylamine

Other amines that can be readily prepared by methods well known in the art include 1,10-decamethylenediamine, 1,12 and 2,11-dodecamethylenediamine, 3,3'-thio-bis-propylamine and 3,3'-dithio-bis-propylamine. The latter material which contains sulfur is readily obtained from 3-mercaptopropylamine by mild oxidation to the disulfide. Treatment with an aminoalkyl halide in the presence of a base yields a similar type of diamine containing one sulfur atom. Other diamines that are applicable in the synthesis of the valuable bis-pyrrolidinones of this invention will occur to one skilled in the art.

The above dibasic acids, that is when R' is H in the original structural formula, are readily prepared by the selective hydrolysis of the corresponding diesters whose preparation was just described. The selective hydrolysis can be carried out in a variety of systems containing various acidic and alkaline reagents. Organic solvents are sometimes employed, but aqueous systems are preferred and particularly those containing barium hydroxide wherein the amount of hydroxide charged is just sufficient to neutralize the carboxyl groups arising from hydrolysis of the ester functions without affecting the lactam rings. Thus the diesters are useful not only as plasticizers, but also as intermediates in the preparation of the corresponding acids.

The following examples are given to further illustrate this valuable invention. However, they are not to be considered as limiting it in any way. In fact, resort may be had to many widely varying embodiments without departing from the spirit and scope thereof.

EXAMPLE I

Dimethyl itaconate, 316 g. (2 moles), and 60 g. (1 mole) of ethylenediamine were mixed, and an exothermic reaction took place which caused the temperature to rise rapidly to 80° C. at which point the reaction vessel was externally cooled in an ice bath to 20° C. The mixture was stirred for one hour. The vessel was then removed from the ice bath and the temperature of the reaction mixture rose slowly to 40° C. and then commenced to fall. The methanol was stripped from the mixture in vacuo on a hot water bath. The residue crystallized upon standing. It was purified by recrystallization from dioxane and benzene yielding a white crystalline product with a melting point of 147–148° C.

*Analysis.*—Calcd. for $C_{14}H_{20}N_2O_6$: C, 53.9; H, 6.44; N, 8.67. Found: C, 54.1; H, 6.38; N, 8.99.

A sample of this material was also purified by distillation. Its boiling point was 236° C. at a pressure of 0.8 mm. of mercury.

EXAMPLE II

The dialkyl itaconates and diamines listed in Table I were similarly employed in the preparation of valuable diesters of this invention. The properties of the resulting products are listed in Table II.

*Table I.—Diamines and dialkyl itaconates*

| Dialkyl Itaconates | Diamines |
|---|---|
| $CH_2$<br>‖<br>$CO-CO_2R'$<br>\|<br>$CH_2-CO_2R'$ | $H_2N-R-NH_2$<br>Ethylenediamine<br>Trimethylenediamine<br>Hexamethylenediamine<br>Ethylene bis-oxypropylamine<br>Diethylenetriamine |

Note.—R′=Methyl; n-Butyl; Iso-amyl; n-Hexyl; 2-ethylhexyl; n-Dodecyl; Iso-octyl; Allyl; Propargyl.

*Table II.—Properties of reaction products of diamines and dialkyl itaconates*

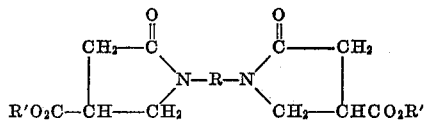

| R | R′ | Boiling Point ° C. (mm. of Hg) | $n_D^{24}$ | Calculated C | Calculated H | Calculated N | Found C | Found H | Found N |
|---|---|---|---|---|---|---|---|---|---|
| $-CH_2CH_2-$ | $CH_3-$ | 236 (0.8) | (M.P. 147–148° C.) | 53.9 | 6.44 | 8.97 | 54.1 | 6.38 | 8.99 |
| $-CH_2CH_2-$ | (n)$C_4H_9-$ | 228 (0.2) | 1.4865 | 60.6 | 8.15 | 7.08 | 60.0 | 7.82 | 7.10 |
| $-CH_2CH_2-$ | (iso)$C_5H_{11}-$ | 235 (0.3) | 1.4829 | 62.2 | 8.55 | 6.60 | 61.8 | 8.54 | 6.61 |
| $-CH_2CH_2-$ | (n)$C_6H_{17}-$ | 292 (0.2) | 1.4820 | 66.2 | 9.46 | 5.51 | 65.7 | 9.10 | 5.67 |
| $-CH_2CH_2-$ | $CH_3(CH_2)_3CHCH_2-C_2H_5-$ | 269 (0.3) | 1.4823 | 66.2 | 9.46 | 5.51 | 65.8 | 9.35 | 5.88 |
| $-CH_2CH_2-$ | (n)$C_{12}H_{25}-$ | Volatile components removed at 272° (0.2). | 1.4842 | 69.6 | 10.40 | 4.52 | 67.5 | 9.44 | 5.21 |
| $-CH_2CH_2-$ | (iso)$C_8H_{17}-$ | 284 (0.2) | 1.4816 | 66.2 | 9.46 | 5.51 | 66.2 | 9.58 | 5.64 |
| $-CH_2CH_2CH_2-$ | $CH_3-$ | 240° (0.7) | (M.P. 67–68°) | 55.2 | 6.82 | 8.60 | 55.1 | 6.87 | 8.40 |
| $-CH_2(CH_2)_4CH_2-$ | $CH_3-$ | 264° (0.5) | 1.5000 | 58.7 | 7.66 | 7.65 | 58.4 | 7.49 | 7.61 |
| $-CH_2(CH_2)_4CH_2-$ | (iso)$C_8H_{17}-$ | Volatile components removed at 200° (0.5). | 1.4822 | 68.1 | 10.0 | 4.96 | 68.4 | 10.10 | 4.84 |
| $-CH_2CH_2CH_2-O-CH_2$<br>\|<br>$-CH_2CH_2CH_2-O-CH_2$ | $CH_3-$ | 160° (0.2) | 1.4995 | 56.2 | 7.56 | 6.55 | 56.2 | 7.64 | 7.08 |
| $-CH_2CH_2CH_2-O-CH_2$<br>\|<br>$-CH_2CH_2CH_2-O-CH_2$ | (n)$C_4H_9-$ | Volatile components removed at 250° (0.1). | 1.4894 | 60.9 | 8.66 | 5.45 | 60.7 | 8.75 | 5.12 |
| $-CH_2CH_2-NHCH_2CH_2-$ | $CH_3-$ | Volatile components removed at 240° (0.7). | (¹) | (¹) | (¹) | (¹) | (¹) | (¹) | (¹) |
| $-CH_2CH_2-$ | $CH_2=CHCH_2-$ | 230° (0.4) | 1.5085 | 59.4 | 6.59 | 7.69 | 59.4 | 6.86 | 7.79 |

¹ Dark amorphous product, not analyzed.

EXAMPLE III

Dimethyl itaconate, two moles, and one mole of diethylenetriamine were mixed and the temperature of the mixture immediately rose to 80° C. At this point, the reaction was cooled to room temperature in an ice bath. The reaction mixture was stripped in vacuo as before. Methanol, which had been evolved in the course of the reaction, was recovered in the distillate. On cooling the product solidified to a dark amorphous solid. This product was water soluble. Its infrared absorption was very similar to the above bis-pyrrolidinones in the region 5.7–9.5μ.

EXAMPLE IV

The product of Example I, (0.5 mole), was refluxed with a 25 percent excess of barium hydroxide in 1 l. of water for two hours. The amount of barium hydroxide employed was based on the amount required to hydrolyze the two ester functions and leave the two lactam rings intact. At the conclusion of the heating period, the solution was cooled and the barium precipitated by treatment with sulfuric acid. The barium sulfate was filtered and the cake washed with hot water to remove a small amount of the bis-pyrrolidinone di-acid that precipitated with it. The combined filtrate and washes were then concentrated in vacuo as before and the product collected. It was a white crystalline solid. It was recrystallized from water. The purified product had a melting point of 231–4° C. This di-acid is soluble in hot water but is insoluble in most organic solvents. The product contained 7.06 milequivalents of acid per gram (theory 7.04).

EXAMPLE V

In order to illustrate the method of preparing the valuable plastic compositions of this invention as well as to demonstrate the utility of these valuable diesters as plasticizers, ethylene-bis-4-carbobutoxy-2-pyrrolidinone (Example II, R=—$CH_2CH_2$— and R′=n-$C_4H_9$) and ethylene-bis-4-carbooctoxy-2-pyrrolidinone (Example II, R=—$CH_2CH_2$— and R′=n-$C_8H_{17}$) were formulated at various concentrations with a vinyl chloride-vinyl acetate copolymer. The resin employed was a commercially available material known as VYNW Vinylite. Dibasic lead stearate (2% based on the VYNW) was incorporated into each mixture as a stabilizer and the mixture was charged to a steam heated two-roll rubber mill heated to 300° F. and fluxed for five minutes. In each case the mixture fluxed almost instantly to an extremely taut flexible sheet. The compositions of each mixture employed and the Shore Durometer hardness of each of the resulting products is tabulated in Table III.

Table III.—Properties of plastic compositions

| Plasticizer (See Example II) | | Parts by Weight | Resin (Parts by Weight) | Dibasic Lead Stearate (Parts by Weight) | Shore Durometer Hardness [1] |
|---|---|---|---|---|---|
| R | R' | | | | |
| $-CH_2CH_2-$ | n-$C_4H_9$ | 30 | 70 | 1.4 | 79 |
| $-CH_2CH_2-$ | n-$C_4H_9$ | 37.5 | 62.5 | 1.25 | 53 |
| $-CH_2CH_2-$ | n-$C_4H_9$ | 45 | 55 | 1.1 | 44 |
| $-CH_2CH_2-$ | n-$C_8H_{17}$ | 30 | 70 | 1.4 | 76 |
| $-CH_2CH_2-$ | n-$C_8H_{17}$ | 37.5 | 62.5 | 1.25 | 61 |
| $-CH_2CH_2-$ | n-$C_8H_{17}$ | 45 | 55 | 1.1 | 46 |

[1] ASTM-D676-46T.

EXAMPLE VI

An alkyd-type of polyester was prepared by heating 28.4 g. (0.1 mole) of the dibasic acid of Example IV together with 8.4 g. (0.11 mole) of propylene glycol, toluene, and p-toluenesulfonic acid. Provision was made to remove water of esterification as formed. The reaction was continued until the rate of removal of water became negligible, at which time the reaction mixture was cooled and immiscible toluene decanted. The heavy oil, after neutralization of the catalyst, proved to be the desired polyester.

EXAMPLE VII

A polyester was prepared by heating in a nitrogen atmosphere a mixture of 28.4 g. (0.1 mole) of the dibasic acid of Example IV, 13 g. (0.1 mole) of itaconic acid, 16.8 g. (0.22 mole) of propylene glycol, toluene, p-toluenesulfonic acid, and hydroquinone. Provision was made to remove water eliminated during esterification as formed. The reaction was continued until the rate of removal of water became negligible, at which time the reaction mixture was cooled. Titration showed the esterification to be 99% complete. The heavy cloudy oil which resulted was diluted with methyl ethyl ketone, the catalyst neutralized with the calculated volume of 0.2 N sodium hydroxide, the solution washed with water, and dried over anhydrous magnesium sulfate. The product was obtained as a very viscous material by evaporation of the solvent. Cross-linking to yield a rigid solid product was achieved by the peroxide catalyzed copolymerization with either styrene or dibutyl itaconate. Other copolymers can be prepared in a similar fashion.

EXAMPLE VIII

In order to demonstrate the production of plastic castings from a valuable bis-pyrrolidinone diester of this invention containing terminal olefinic groupings, N,N'-ethylene-bis-(4-carboallyloxy)-2-pyrrolidinone alone and mixed in various proportions with styrene and with methyl methacrylate was thermally polymerized using 0.5–1% of benzoyl peroxide as the initiator. The liquid monomers, 10 g. samples each of pure bis-pyrrolidinone and each composition, were placed in glass vials containing in some cases 50 mg. and others 100 mg. of benzoyl peroxide and heated in an oven in which the temperature was increased from 40° C. to 100° C. during about six days. The vials were then cracked and removed from the plastic castings contained therein. The compositions of the mixtures employed are listed in Table III. All yielded hard and tough castings. Those containing styrene were somewhat cloudy in appearance. All of the others were transparent.

Table IV.—The preparation of plastic castings

| Percent N,N'-ethylene-bis-(4-carboallyloxy)-2-pyrrolidinone | Percent Styrene | Percent Methyl Methacrylate | Percent Benzoyl Peroxide |
|---|---|---|---|
| 100 | 0 | 0 | 1 |
| 10 | 90 | 0 | 1 |
| 30 | 70 | 0 | 1 |
| 50 | 50 | 0 | 1 |
| 10 | 0 | 90 | 0.5 |
| 30 | 0 | 70 | 0.5 |
| 50 | 0 | 50 | 0.5 |

This application is a divisional application of copending application Serial No. 552,289 filed December 12, 1955, now abandoned.

What is claimed is:

1. A plastic composition comprising a vinyl resin and a compound of the formula

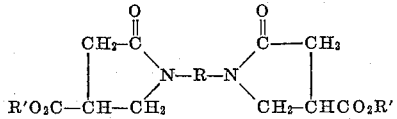

wherein R' is a lower aliphatic hydrocarbon group containing up to about 8 carbon atoms and R is a divalent organic radical containing from 2 to 12 carbon atoms and selected from the group consisting of alkylene, oxalkylene, thialkylene and azalkylene wherein the last three members of said group contain less than 4 hetero groups selected from the group consisting of —O—, —S—, —NH—, —S—S—, and —NH—NH— and such that no carbon atom is attached to more than one atom selected from the group consisting of oxygen, sulfur and nitrogen.

2. The plastic composition of claim 1 wherein said compound of the formula comprises from 5 to 50% by weight of said composition.

3. The plastic composition of claim 2 wherein the total number of carbon atoms in the two R' groups and the R group of said compound of the formula is from about 10 to about 28.

No references cited.